United States Patent
Murase et al.

(10) Patent No.: US 12,034,167 B2
(45) Date of Patent: Jul. 9, 2024

(54) CARBON NANOTUBE DISPERSION LIQUID, SLURRY FOR SECONDARY BATTERY ELECTRODE, METHOD OF PRODUCING SLURRY FOR SECONDARY BATTERY ELECTRODE, ELECTRODE FOR SECONDARY BATTERY, AND SECONDARY BATTERY

(71) Applicant: ZEON CORPORATION, Tokyo (JP)

(72) Inventors: Tomoya Murase, Tokyo (JP); Naoki Takahashi, Tokyo (JP); Shinsuke Sugawara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 443 days.

(21) Appl. No.: 16/979,519

(22) PCT Filed: Mar. 18, 2019

(86) PCT No.: PCT/JP2019/011241
§ 371 (c)(1),
(2) Date: Sep. 10, 2020

(87) PCT Pub. No.: WO2019/181869
PCT Pub. Date: Sep. 26, 2019

(65) Prior Publication Data
US 2021/0005894 A1 Jan. 7, 2021

(30) Foreign Application Priority Data
Mar. 23, 2018 (JP) ................................ 2018-056993

(51) Int. Cl.
| | |
|---|---|
| H01M 4/62 | (2006.01) |
| C01B 32/174 | (2017.01) |
| H01M 4/133 | (2010.01) |
| H01M 4/1393 | (2010.01) |
| H01M 4/36 | (2006.01) |
| H01M 4/60 | (2006.01) |
| H01M 4/88 | (2006.01) |
| H01M 10/0525 | (2010.01) |

(52) U.S. Cl.
CPC ........... *H01M 4/622* (2013.01); *C01B 32/174* (2017.08); *H01M 4/133* (2013.01); *H01M 4/1393* (2013.01); *H01M 4/364* (2013.01); *H01M 4/606* (2013.01); *H01M 4/8828* (2013.01); *H01M 10/0525* (2013.01)

(58) Field of Classification Search
CPC .... H01M 4/622; H01M 4/133; H01M 4/1393; H01M 4/364; H01M 4/606; H01M 4/8828; H01M 10/0525; H01M 4/13; H01M 4/139; H01M 4/625; H01M 4/04; C01B 32/174; C08K 3/041; C08F 2810/50; C08F 8/04; C08F 212/08; C08L 25/10; Y02E 60/10; Y02E 60/50; H01B 1/24
See application file for complete search history.

(56) References Cited

U.S. PATENT DOCUMENTS

| | | | |
|---|---|---|---|
| 2018/0226650 A1* | 8/2018 | Yoo | H01M 4/364 |
| 2018/0277848 A1* | 9/2018 | Matsumura | H01M 4/1391 |
| 2018/0301744 A1* | 10/2018 | Fukumine | C08K 3/041 |

FOREIGN PATENT DOCUMENTS

| | | | |
|---|---|---|---|
| CN | 107710468 A | 2/2018 | |
| EP | 3316359 A1 | 5/2018 | |
| EP | 3348582 A1 | 7/2018 | |
| EP | 3358651 A1 | 8/2018 | |
| EP | 3316359 B1 | 6/2021 | |
| JP | 2007056136 A | 3/2007 | |
| JP | 2007169120 A | 7/2007 | |
| JP | 2012204303 A | 10/2012 | |
| JP | 2016021390 A | 2/2016 | |
| KR | 1020180021698 A | 3/2018 | |
| WO | 2016208190 A1 | 12/2016 | |
| WO | 2017043818 A1 | 3/2017 | |
| WO | WO-2017043818 A1 * | 3/2017 | ............. B82Y 30/00 |
| WO | 2017056488 A1 | 4/2017 | |

OTHER PUBLICATIONS

Dec. 16, 2021, the Extended European Search Report issued by the European Patent Office in the corresponding European Patent Application No. 19771860.4.
Sep. 29, 2020, International Preliminary Report on Patentability issued in the International Patent Application No. PCT/JP2019/011241
May 21, 2019, International Search Report issued in the International Patent Application No. PCT/JP2019/011241.

\* cited by examiner

*Primary Examiner* — Andrew J. Oyer
(74) *Attorney, Agent, or Firm* — KENJA IP LAW PC

(57) ABSTRACT

Disclosed is a carbon nanotube dispersion liquid containing carbon nanotubes, a binder, and a dispersion medium. The binder includes a polymer (A) containing an aromatic vinyl monomer unit and a linear alkylene structural unit having a carbon number of at least 4. The proportion of the binder in the carbon nanotube dispersion liquid is 30 mass % or less, and the viscosity change rate of the carbon nanotube dispersion liquid as measured under predetermined conditions before and after leaving the carbon nanotube dispersion liquid for 1 week is 50% or more and 300% or less.

6 Claims, No Drawings

CARBON NANOTUBE DISPERSION LIQUID, SLURRY FOR SECONDARY BATTERY ELECTRODE, METHOD OF PRODUCING SLURRY FOR SECONDARY BATTERY ELECTRODE, ELECTRODE FOR SECONDARY BATTERY, AND SECONDARY BATTERY

TECHNICAL FIELD

This disclosure relates to a carbon nanotube dispersion liquid and a slurry for a secondary battery electrode using the same, a method of producing a slurry for a secondary battery electrode, an electrode for a secondary battery, and a secondary battery.

BACKGROUND

Carbon nanotubes (hereinafter, also referred to as "CNTs") have a cylindrical structure in which flat sheets of graphite (graphene sheets) are rolled in around themselves. Due to their nanostructure specificity, carbon nanotubes exhibit a variety of properties. In particular, carbon nanotubes are superior to copper in terms of their current density resistance, which is at least 1000 times higher than that of copper, their thermal conductivity, which is about 10 times higher than that of copper, and their tensile strength, which is about 20 times higher than that of steel, and they are expected to be used in a variety of applications.

In order to fully demonstrate the inherent performance described above, carbon nanotubes need to be dispersed because of their tendency to aggregate. In general, carbon nanotubes are difficult to disperse by themselves, and thus they can be dispersed in water, organic solvents, or the like, and used in the form of a carbon nanotube dispersion liquid.

For example, JP2007-056136A (PTL 1) provides a method of producing a dispersion liquid in which carbon nanotubes are stably and uniformly dispersed by using a comb-shaped basic dispersion medium in carbon nanotubes. In addition, JP2007-169120A (PTL 2) provides a method of dispersing carbon nanotubes in which preservation stability after dispersion of carbon nanotubes is improved and carbon nanotubes can be well dispersed even at high concentrations by performing beads dispersion using beads of a certain size and a polymeric dispersion medium with an amine value such that carbon nanotubes can be well dispersed.

CITATION LIST

Patent Literature

PTL 1: JP2007-056136A
PTL 2: JP2007-169120A

SUMMARY

Technical Problem

However, the above-described conventional carbon nanotube dispersion liquids (hereinafter, also referred to as "CNT dispersion liquids") have room for improvement because dispersibility of carbon nanotubes is insufficient for some of their applications. Specifically, for example, it is required to increase the dispersibility of carbon nanotubes in CNT dispersion liquids used in a slurry for producing electrodes for secondary batteries such as lithium-ion batteries, the slurry including a CNT dispersion liquid containing CNTs, a binder, and a dispersion liquid, and an electrode active material.

It would be thus helpful to provide a carbon nanotube dispersion liquid that is useful for various applications because of excellent dispersibility of carbon nanotubes.

It would also be helpful to provide a slurry for a secondary battery electrode suitable for producing a secondary battery such as a lithium ion secondary battery.

It would also be helpful to provide a method of producing a slurry for a secondary battery electrode that enables efficient production of the slurry for a secondary battery electrode set forth above.

It would also be helpful to provide an electrode for a secondary battery capable of improving battery characteristics of a secondary battery, and a secondary battery having excellent battery characteristics.

Technical Problem

The inventors made extensive studies to address the foregoing issues. The inventors found that carbon nanotubes exhibit excellent dispersibility in a carbon nanotube dispersion liquid that contains a specific amount of a binder including a specific polymer and that exhibits a specific viscosity change rate under predetermined conditions. The inventors also found that the use of a slurry for a secondary battery electrode containing the carbon nanotube dispersion liquid set forth above enables production of an electrode for a secondary battery and a secondary battery using carbon nanotubes in the carbon nanotube dispersion liquid as a conductive material. The inventors completed the present disclosure based on these findings.

In order to advantageously address the above issues, the present disclosure provides a carbon nanotube dispersion liquid comprising: carbon nanotubes; a binder; and a dispersion medium, wherein the binder includes a polymer (A) containing an aromatic vinyl monomer unit and a linear alkylene structural unit having a carbon number of at least 4, a proportion of the binder relative to a total solid content of the carbon nanotube dispersion liquid is 30 mass % or less, and a viscosity change rate of the carbon nanotube dispersion liquid as measured under conditions of a temperature of 25° C. and a shear rate of 0.1 s$^{-1}$ before and after leaving the carbon nanotube dispersion liquid for 1 week is 50% or more and 300% or less. As described above, in the case of a carbon nanotube dispersion liquid containing a specific amount of a binder including a specific polymer and exhibiting a specific viscosity change rate under predetermined conditions, it is possible to provide the carbon nanotube dispersion liquid usefully for various applications because of excellent dispersibility of carbon nanotubes.

In the presently disclosed carbon nanotube dispersion liquid, it is preferable that the polymer (A) contains the aromatic vinyl monomer unit in an amount of 30 mass % or more and 60 mass % or less. When the percentage content of the aromatic vinyl monomer unit in the polymer (A) is within the range set forth above, solubility in an organic solvent such as N-methyl-2-methylpyrrolidone (NMP) is ensured. This allows carbon nanotubes to be dispersed well in the carbon nanotube dispersion liquid. As a result, the viscosity of the carbon nanotube dispersion liquid can be stabilized. Furthermore, when an electrode for a secondary battery is produced using a slurry for a secondary battery electrode containing the presently disclosed carbon nanotube dispersion liquid, the flexibility of the electrode can be improved.

In the present disclosure, the percentage content of a repeating unit such as an aromatic vinyl monomer unit can be measured with techniques like nuclear magnetic resonance (NMR methods) such as $^1$H-NMR.

In addition, in the presently disclosed carbon nanotube dispersion liquid, it is preferable that the polymer (A) contains the linear alkylene structural unit having a carbon number of at least 4 in an amount of 20 mass % or more and 50 mass % or less. When the percentage content of the linear alkylene structural unit having a carbon number of at least 4 in the polymer (A) is within the range set forth above, the solubility of the binder in an organic solvent such as NMP is ensured, allowing carbon nanotubes to be dispersed well in the CNT dispersion liquid. As a result, the viscosity of the carbon nanotube dispersion liquid can be more reliably stabilized. Furthermore, when an electrode for a secondary battery is produced using a slurry for a secondary battery electrode containing the presently disclosed carbon nanotube dispersion liquid, the flexibility of the electrode can be further improved.

Further, in the presently disclosed carbon nanotube dispersion liquid, it is preferable that the polymer (A) has an iodine value of 50 mg/100 mg or less. When the iodine value of the polymer (A) is not more than the upper limit set forth above, it is possible to ensure good dispersibility of carbon nanotubes in the carbon nanotube dispersion liquid and thereby stabilize the viscosity of the carbon nanotube dispersion liquid. It is also possible to keep a low swelling ratio of the binder relative to the electrolyte solution in a secondary battery having an electrode for a secondary battery that is produced using a slurry for a secondary battery electrode containing the presently disclosed carbon nanotube dispersion liquid. Moreover, as the swelling ratio of the binder relative to the electrolyte solution decreases, the electrolyte solution resistance of the binder improves, and the electrode structure can be maintained. This setup may lower the resistance of the lithium ion secondary battery, and thus improve the life characteristics of the secondary battery.

In the presently disclosed carbon nanotube dispersion liquid, it is preferable that the polymer (A) has a weight-average molecular weight of 1,000 or more and 500,000 or less. When the weight-average molecular weight of the polymer (A) is not less than the lower limit set forth above, it is possible to improve the peel strength of an electrode for a secondary battery that is produced using a slurry for a secondary battery electrode containing the presently disclosed carbon nanotube dispersion liquid. Additionally, it is possible to keep a low swelling ratio of the binder relative to the electrolyte solution in a secondary battery having the electrode for a secondary battery set forth above. As a result, the life characteristics of the secondary battery can be improved. On the other hand, when the weight-average molecular weight of the polymer (A) is not more than the upper limit set forth above, the solubility of the binder in an organic solvent such as NMP is more reliably ensured, allowing carbon nanotubes to be dispersed well in the CNT dispersion liquid. As a result, the viscosity of the CNT dispersion liquid can be stabilized.

To advantageously address the above issues, the present disclosure provides a slurry for a secondary battery electrode comprising an electrode active material and any of the carbon nanotube dispersion liquids set forth above. In this way, with the carbon nanotube dispersion liquid set forth above, carbon nanotubes in the carbon nanotube dispersion liquid can be used as a conductive material to provide a slurry for a secondary battery electrode in which the conductive material exhibits excellent dispersibility.

To advantageously address the above issues, the present disclosure provides a method of producing the slurry for a secondary battery electrode set forth above, comprising: a first step of mixing the carbon nanotubes, the binder, and the dispersion medium to obtain a carbon nanotube dispersion liquid; and a second step of mixing the carbon nanotube dispersion liquid and the electrode active material. In this way, according to the disclosed method including the first step of mixing the carbon nanotubes, the binder, and the dispersion medium to obtain a carbon nanotube dispersion liquid, and the second step of mixing the carbon nanotube dispersion liquid and the electrode active material, a slurry for a secondary battery electrode can be efficiently produced.

To advantageously address the above issues, the present disclosure provides an electrode for a secondary battery comprising an electrode mixed material layer formed from the slurry for a secondary battery electrode set forth above. In this way, the use of the slurry for a secondary battery electrode set forth above enables favorable formation of an electrode mixed material layer, making it possible to improve the battery characteristics of a secondary battery including the electrode for a secondary battery set forth above.

To advantageously address the above issues, the present disclosure provides a secondary battery comprising the electrode for a secondary battery set forth above. In this way, the use of the electrode for a secondary battery set forth above enables production of a secondary battery having excellent battery characteristics because of excellent dispersibility of carbon nanotubes as a conductive material.

Advantageous Effect

According to the present disclosure, it is possible to provide a carbon nanotube dispersion liquid that is useful for various applications because of excellent dispersibility of carbon nanotubes.

In addition, according to the present disclosure, carbon nanotubes in the carbon nanotube dispersion liquid set forth above can be used as a conductive material to provide a slurry for a secondary battery electrode in which the conductive material exhibits excellent dispersibility.

Further, it is possible to provide a method that enables efficient production of the slurry for a secondary battery electrode set forth above.

Moreover, according to the present disclosure, the use of the slurry for a secondary battery electrode set forth above enables production of an electrode for a secondary battery capable of improving battery characteristics of a secondary battery, and a secondary battery having excellent battery characteristics.

DETAILED DESCRIPTION

The following provides a detailed description of embodiments of the present disclosure.

A carbon nanotube dispersion liquid according to the present disclosure contains a specific amount of a binder including a specific polymer and exhibits a specific viscosity change rate under predetermined conditions. The slurry for a secondary battery electrode according to the present disclosure contains the presently disclosed carbon nanotube dispersion liquid, and can be used, for example, in production of an electrode for a secondary battery. Further, the electrode for a secondary battery may be used in production of a secondary battery.

(Carbon Nanotube Dispersion Liquid)

The presently disclosed carbon nanotube (CNT) dispersion liquid is a CNT dispersion liquid comprising: carbon nanotubes; a binder; and a dispersion medium, wherein the binder includes a polymer (A) containing an aromatic vinyl monomer unit and a linear alkylene structural unit having a carbon number of at least 4, a proportion of the binder relative to a total solid content of the CNT dispersion liquid is 30 mass % or less, and a viscosity change rate of the CNT dispersion liquid as measured under conditions of a temperature of 25° C. and a shear rate of $0.1\ s^{-1}$ before and after leaving the CNT dispersion liquid for 1 week is 50% or more and 300% or less.

<Carbon Nanotubes>

The carbon nanotubes (CNTs) contained in the CNT dispersion liquid may be single-walled carbon nanotubes or multi-walled carbon nanotubes.

The CNTs have an average diameter of preferably 0.5 nm or more and more preferably 1 nm or more, and of preferably 15 nm or less. When the average diameter of the CNTs is not less than the lower limit set forth above, aggregation of the CNTs in the CNT dispersion liquid can be suppressed. On the other hand, when the average diameter of the CNTs is not more than the upper limit set forth above, it is possible to improve the flexibility of an electrode in a secondary battery produced using a slurry for a secondary battery electrode containing the CNT dispersion liquid.

The average diameter of CNTs can be determined by averaging the results of measuring the diameter of 100 randomly selected carbon nanotubes using a transmission electron microscope.

In addition, the CNTs has an average length of preferably 0.1 μm or more, and of preferably 1 cm or less and more preferably 1 mm or less. When the average length of the CNTs is within any of the ranges set forth above, aggregation of the CNTs can be suppressed.

Note that the average length of the CNTs can be determined by averaging the results of measuring the length of 100 randomly selected CNTs using a transmission electron microscope.

The CNTs has a specific surface area of preferably 50 $m^2/g$ or more, more preferably 70 $m^2/g$ or more, and even more preferably 100 $m^2/g$ or more, and of preferably 400 $m^2/g$ or less, more preferably 350 $m^2/g$ or less, and even more preferably 300 $m^2/g$ or less. When the specific surface area of the CNTs is within any of the ranges set forth above, the CNTs are allowed to be well dispersed in the CNT dispersion liquid, making it possible to stabilize the viscosity of the CNT dispersion liquid.

As used herein, the term "specific surface area" refers to a nitrogen adsorption specific surface area that is measured by the BET method.

The percentage content of the CNTs in the CNT dispersion liquid is not particularly limited, and may be appropriately adjusted depending on the application of the CNT dispersion liquid.

Examples of methods by which the CNTs used in the present disclosure can be prepared include, but are not particularly limited to, known CNT synthesis methods such as an arc-discharge method, a laser ablation method, and a chemical vapor deposition (CVD) method.

<Binder>

In the present disclosure, the binder includes a polymer (A) containing an aromatic vinyl monomer unit and a linear alkylene structural unit having a carbon number of at least 4, and may optionally contain a polymer (B) and/or other components.

[Polymer (A)]

The polymer (A) needs to contain an aromatic vinyl monomer unit and a linear alkylene structural unit having a carbon number of at least 4, and, optionally, further contains one or more monomer units other than the aromatic vinyl monomer unit and the linear alkylene structural unit having a carbon number of at least 4.

—Aromatic Vinyl Monomer Unit—

As used herein, an aromatic vinyl monomer unit refers to a repeating unit that is derived from an aromatic vinyl monomer. Examples of aromatic vinyl monomers that can be used to form the aromatic vinyl monomer unit include styrene, α-methylstyrene, vinyltoluene, and divinyl benzene. One of such aromatic vinyl monomers may be used individually, or two or more of such aromatic vinyl monomers may be used in combination.

The percentage content of the aromatic vinyl monomer unit in the polymer (A) when all repeating units in the polymer (A) are taken to be 100 mass % is preferably 30 mass % or more, more preferably 35 mass % or more, even more preferably 40 mass % or more, and is preferably 60 mass % or less, more preferably 55 mass % or less, and even more preferably 50 mass % or less. When the percentage content of the aromatic vinyl monomer unit in the polymer (A) is not less than any of the lower limits set forth above, the solubility of the binder in an organic solvent such as NMP is ensured, allowing CNTs to be dispersed well in the CNT dispersion liquid. As a result, the viscosity of the CNT dispersion liquid can be stabilized. On the other hand, when the percentage content of the aromatic vinyl monomer unit in the polymer (A) is not more than any of the upper limits set forth above, the flexibility of an electrode for a secondary battery that is produced using a slurry for a secondary battery electrode containing the CNT dispersion liquid is improved.

—Linear Alkylene Structural Unit Having a Carbon Number of at Least 4—

As used herein, a linear alkylene structural unit having a carbon number of at least 4 refers to a repeating unit composed of an alkylene structure represented by a general formula: $-C_nH_{2n}-$, where n is an integer of 4 or more.

Although no specific limitations are placed on the method by which the linear alkylene structural unit having a carbon number of at least 4 is introduced into the polymer (A), the methods described below in (1) and (2) may for example be used:

(1) a method involving preparing a polymer from a monomer composition containing a conjugated diene monomer and hydrogenating the resultant polymer in order to convert the conjugated diene monomer unit to an alkylene structural unit; and (2) a method involving preparing a polymer from a monomer composition containing a 1-olefin monomer having a carbon number of at least 4.

Of these, the method described in (1) is preferable in terms of ease of production of the polymer.

In addition, examples of the conjugated diene monomer include conjugated diene monomers having a carbon number of at least 4 such as 1,3-butadiene, isoprene, 2,3-dimethyl-1,3-butadiene, and 1,3-pentadiene. Of these, 1,3-butadiene is preferred as the conjugated diene monomer. In other words, the linear alkylene structural unit having a carbon number of at least 4 is preferably a structural unit obtained through hydrogenation of a conjugated diene monomer unit (i.e., a hydrogenated conjugated diene unit), and more preferably a structural unit obtained through hydrogenation of a 1,3-butadiene unit (i.e., a hydrogenated 1,3-butadiene unit). Note that selective hydrogenation of the conjugated diene monomer unit can be carried out by a commonly known method such as an oil-layer hydrogenation method or a water-layer hydrogenation method.

Examples of the 1-olefin monomer having a carbon number of at least 4 include 1-butene and 1-hexene.

One of such monomers may be used individually, or two or more of such monomers may be used in combination.

The percentage content of the linear alkylene structural unit having a carbon number of at least 4 in the polymer (A) when all repeating units in the polymer (A) are taken to be 100 mass % is preferably 20 mass % or more, more preferably 23 mass % or more, even more preferably 25 mass % or more, and is preferably 50 mass % or less, more preferably 45 mass % or less, and even more preferably 40 mass % or less. When the percentage content of the linear alkylene structural unit having a carbon number of at least 4 in the polymer (A) is not less than any of the lower limits set forth above, the flexibility of an electrode for a secondary battery that is produced using a slurry for a secondary battery electrode containing the CNT dispersion liquid is improved. On the other hand, when the percentage content of the linear alkylene structural unit having a carbon number of at least 4 in the polymer (A) is not more than any of the upper limits set forth above, the solubility of the binder in a dispersion medium such as NMP is more reliably ensured, allowing CNTs to be dispersed well in the CNT dispersion liquid. As a result, the viscosity of the CNT dispersion liquid can be stabilized.

—Other Monomer Units—

Other monomer units that may be contained in the polymer (A) include, for example, a nitrile group-containing monomer unit, a hydrophilic group-containing monomer unit, and a (meth)acrylic acid ester monomer unit.

—Nitrile Group-Containing Monomer Unit—

As used herein, a nitrile group-containing monomer unit refers to a repeating unit that is derived from a nitrile group-containing monomer.

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples thereof include acrylonitrile; α-halogenoacrylonitriles such as α-chloroacrylonitrile and α-bromoacrylonitrile; and α-alkylacrylonitriles such as methacrylonitrile and α-ethylacrylonitrile.

One of such monomers may be used individually, or two or more of such monomers may be used in combination.

The percentage content of the nitrile group-containing monomer unit in the polymer (A) when all repeating units in the polymer (A) are taken to be 100 mass % is preferably 10 mass % or more and more preferably 13 mass % or more, and is preferably 40 mass % or less and more preferably 30 mass % or less. When the percentage content of the nitrile group-containing monomer unit in the polymer (A) is not less than any of the lower limits set forth above, it is possible to improve the peel strength of an electrode for a secondary battery that is produced using a binder for a secondary battery electrode containing the presently disclosed CNT dispersion liquid. On the other hand, when the percentage content of the nitrile group-containing monomer unit in the polymer (A) is not more than any of the upper limits set forth above, it is possible to keep a low swelling ratio of the binder relative to the electrolyte solution in a secondary battery having an electrode for a secondary battery that is produced using a slurry for a secondary battery electrode containing the presently disclosed CNT dispersion liquid. As a result, the life characteristics of the secondary battery can be improved.

—Hydrophilic Group-Containing Monomer Unit—

As used herein, a hydrophilic group-containing monomer unit refers to a repeating unit that is derived from a hydrophilic group-containing monomer unit.

Examples of hydrophilic group-containing monomers that can be used to form the hydrophilic group-containing monomer unit include polymerizable monomers having a hydrophilic group. Specific examples of the hydrophilic group-containing monomers include monomers having acidic group-containing monomer units, hydroxyl group-containing monomer units, and salts thereof. Examples of acidic group-containing monomer units include a carboxylic acid group, a sulfo group, and a phosphate group.

Examples of monomers having a carboxylic acid group include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of acid anhydrides of dicarboxylic acids include maleic anhydride, acrylic anhydride, methyl maleic anhydride, and dimethyl maleic anhydride.

Examples of derivatives of dicarboxylic acids include methylmaleic acid, dimethylmaleic acid, phenylmaleic acid, chloromaleic acid, di chloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Furthermore, an acid anhydride that produces a carboxyl group upon hydrolysis can also be used as a carboxylic acid group-containing monomer. Other examples include monoesters and diesters of α,β-ethylenically unsaturated polybasic carboxylic acids such as monoester maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of monomers having a sulfo group include vinyl sulfonic acid, methyl vinyl sulfonic acid, (meth)acrylic sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

As used herein, "(meth)acrylic" is used to indicate "acrylic" and/or "methacrylic".

Examples of monomers having a phosphate group include 2-(meth)acryloyloxyethyl phosphate, methyl-2-(meth)acryloyloxyethyl phosphate, and ethyl-(meth)acryloyloxyethyl phosphate.

As used herein, "(meth)acryloyl" is used to indicate "acryloyl" and/or "methacryloyl".

Examples of monomers having a hydroxyl group include: ethylene unsaturated alcohols such as (meth)allyl alcohol, 3-butene-1-ol and 5-hexen-1-ol; alkanol esters of ethylenically unsaturated carboxylic acids, such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of polyalkylene glycol and (meth)acrylic acid represented by a general formula: $CH_2=CR^1-COO-(C_qH_{2q}O)_p-H$ (in the formula, p represents an integer of 2 to 9, q represents an integer of 2 to 4, and $R^1$ represents hydrogen or a methyl group); mono-(meth)acrylic acid esters of dihydroxy esters of dicarboxylic acids, such as 2-hydroxyethyl-2'-(meth)acryloyl oxyphthalate and 2-hydroxyethyl-2'-(meth)acryloyl oxy succinate; vinylethers, such as 2-hydroxyethyl vinyl ether and 2-hydroxypropyl vinyl ether; mono(meth)allyl ethers of alkylene glycols, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol (meth)monoallyl ethers, such as diethylene glycol mono(meth)allyl ether and dipropylene glycol mono(meth)allyl ether; mono(meth)allyl ethers of halogen or hydroxy substituted products of (poly)alkylene glycols, such as glycerin mono(meth)allyl ether, (meth)allyl-2-chloro-3-hydroxypropyl ether, and (meth)allyl-2-hydroxy-3-chloropropyl ether; mono(meth)allyl ethers of polyphenols, such as eugenol and isoeugenol, and halogen substituted products thereof; and (meth)allyl thioethers of alkylene glycols, such as (meth)allyl-2-hydroxyethyl thioether and (meth)allyl-2-hydroxypropyl thioether.

One of such monomers may be used individually, or two or more of such monomers may be used in combination.

The percentage content of the hydrophilic group-containing monomer unit in the polymer (A) when all repeating units in the polymer (A) are taken to be 100 mass % is preferably 0.1 mass % or more and more preferably 1 mass % or more, and is preferably 10 mass % or less and more preferably 8 mass % or less. When the percentage content of the hydrophilic group-containing monomer unit in the polymer (A) is not less than any of the lower limits set forth above, it is possible to improve the peel strength of an electrode for a secondary battery that is produced using a slurry for a secondary battery electrode containing the presently disclosed CNT dispersion liquid. On the other hand, when the percentage content of the hydrophilic group-containing monomer unit in the polymer (A) is not more than any of the upper limits set forth above, it is possible to reduce the battery resistance of a secondary battery that is produced using a slurry for a secondary battery electrode containing the presently disclosed CNT dispersion liquid.

—(Meth)acrylic Acid Ester Monomer Unit—

As used herein, a (meth)acrylic acid ester monomer unit refers to a repeating unit that is derived from a (meth)acrylic acid ester monomer.

Examples of (meth)acrylic acid ester monomers that can be used to form the (meth)acrylic acid ester monomer unit include: acrylic acid alkyl esters, such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate (also referred to as "acrylic acid-2-ethylhexyl"), nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

One of such monomers may be used individually, or two or more of such monomers may be used in combination.

The percentage content of the (meth)acrylic acid ester monomer unit in the polymer (A) when all repeating units in the polymer (A) are taken to be 100 mass % is preferably 20 mass % or less. Of course, the polymer (A) may not contain the other monomer units. In other words, the percentage content of the (meth)acrylic acid ester monomer unit in the polymer (A) may be substantially 0 mass %.

—Iodine Value—

In addition, the iodine value of the polymer (A) is preferably 50 mg/100 mg or less, more preferably 40 mg/100 mg or less, and even more preferably 20 mg/100 mg or less. When the iodine value of the polymer (A) is not more than any of the upper limits set forth above, CNTs are allowed to be dispersed well in the CNT dispersion liquid, and thus the viscosity of the CNT dispersion liquid can be stabilized. Then, it is possible to keep a low swelling ratio of the binder relative to the electrolyte solution in a secondary battery having an electrode for a secondary battery that is produced using a slurry for a secondary battery electrode containing the presently disclosed CNT dispersion liquid. As a result, the life characteristics of the secondary battery can be improved.

Note that the iodine value can be determined in accordance with JIS K6235 (2006).

—Weight-Average Molecular Weight—

The weight-average molecular weight of the polymer (A) is preferably 1000 or more, more preferably 5000 or more, and even more preferably 10,000 or more, and is preferably 500,000 or less, more preferably 300,000 or less, and even more preferably 100,000 or less. When the weight-average molecular weight of the polymer (A) is not less than any of the lower limits set forth above, it is possible to improve the peel strength of an electrode for a secondary battery that is produced using a slurry for a secondary battery electrode containing the presently disclosed CNT dispersion liquid. Additionally, in a secondary battery having the electrode for a secondary battery, it is possible to keep a low swelling ratio of the binder relative to the electrolyte solution, and thus the life characteristics of the secondary battery can be improved. On the other hand, when the weight-average molecular weight of the polymer (A) is not more than any of the upper limits set forth above, the solubility of the binder in an organic solvent such as NMP is ensured, allowing CNTs to be dispersed well in the CNT dispersion liquid. As a result, the viscosity of the CNT dispersion liquid can be stabilized.

Note that the "weight-average molecular weight" of the polymer (A) is measured using the methods described in the EXAMPLES section below.

—Method of Producing Polymer (A)—

Although no specific limitations are placed on the method by which the polymer (A) is produced, the polymer (A) may, for example, be produced by polymerizing a monomer composition containing the monomers set forth above optionally in the presence of a molecular weight modifier or a terminator.

The polymerization method of the polymer (A) is not particularly limited and may, for example, be any of solution polymerization, suspension polymerization, bulk polymerization, and emulsion polymerization. Further, any polymerization reaction may be used, such as ionic polymerization, radical polymerization, or living radical polymerization.

In addition, the polymerization may be performed using an emulsifier, a dispersant, a polymerization initiator, a polymerization aid, a molecular weight modifier, an initiator, and the like that are commonly used, and the amount thereof may also be the same as commonly used. Note that a solution containing the polymer (A) and a polymerization solvent that is obtained by polymerizing the monomer composition set forth above may be used as a binder as it is, or as a binder after undergoing solvent substitution, addition of other optional components, and the like.

In addition, in 100 mass % of the total solid content of the CNT dispersion liquid, the proportion of the polymer (A) is preferably 0.1 mass % or more, more preferably 1.0 mass % or more, and even more preferably 3.0 mass % or more, and is preferably 30 mass % or less, more preferably 27 mass % or less, and even more preferably 25 mass % or less.

[Polymer (B)]

The type of a polymer (B) that may be contained in the binder is not particularly limited as long as it does not correspond to the polymer (A). For example, when the CNT dispersion liquid is used for preparing a slurry for a secondary battery electrode, the polymer (B) may be a fluorine-containing polymer such as polyvinylidene fluoride (PVDF) or polyvinylidene fluoride-hexafluoropropylene (PVDF-HFP), polyacrylonitrile (PAN), or the like.

One of such polymers (B) may be used individually, or two or more of such polymers (B) may be used in combination.

Further, the proportion of the polymer (B) relative to the entire binder content in the CNT dispersion liquid is preferably 40 mass % or less, more preferably 30 mass % or less, and even more preferably 20 mass % or less, in terms of solid content. When the proportion of the polymer (B) in the CNT dispersion liquid is not more than any of the upper limits set forth above, CNTs are allowed to be dispersed well in the CNT dispersion liquid, and thus the viscosity of the carbon nanotube dispersion liquid can be stabilized. It is also possible to improve the flexibility of an electrode for a secondary battery that is produced using a slurry for a secondary battery electrode containing the CNT dispersion liquid.

[Other Components]

Further, in addition to the polymer (B), the binder may contain any known optional components that can be contained in the binder as other components within a range not to impair the effect of the present disclosure.

<Preparation of Binder>

Although no specific limitations are placed on the method by which the binder is prepared, the binder may, for example, be prepared by optionally mixing a water dispersion of the polymer (A) obtained by polymerizing the monomer composition set forth above with the polymer (B) and/or other components.

<Dispersion Medium>

Further, the dispersion medium contained in the CNT dispersion liquid is not particularly limited, and may, for example, be an organic solvent. Examples of organic solvents include: cyclic aliphatic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methylcyclohexane, and ethyl cyclohexane; chlorinated aliphatic hydrocarbons such as methylene chloride, chloroform, and carbon tetrachloride; esters such as ethyl aromatic acetate, butyl acetate, γ-butyrolactone, and ε-caprolactone; acyclonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methyl-2-methylpyrrolidone (NMP) and N,N-dimethylformamide. Of these, NMP is preferred.

One of such dispersion media may be used individually, or two or more of such dispersion media may be used as a mixed solvent.

<Conductive Material>

The CNT dispersion liquid may contain another conductive material. The other conductive material may be a conductive material other than CNTs, and examples thereof include: conductive carbon materials such as carbon black (e.g., acetylene black, Ketjenblack® (Ketjenblack is a registered trademark in Japan, other countries, or both), and furnace black), carbon nanohorns, vapor-grown carbon fiber, milled carbon fiber obtained by pyrolyzing and then pulverizing polymer fiber, single layer or multilayer graphene, and carbon non-woven fabric sheets obtained through pyrolysis of non-woven fabric made from polymer fiber; and fibers and foils of various metals.

One of such conductive materials may be used individually, or two or more of such conductive materials may be used in combination.

<Total Solid Content Concentration>

The total solid content concentration in the CNT dispersion liquid is preferably 1 mass % or more, more preferably 2 mass % or more, and even more preferably 3 mass % or more, and is preferably 20 mass % or less, more preferably 15 mass % or less, and even more preferably 12 mass % or less. When the total solid content concentration in the CNT dispersion liquid is not less than any of the lower limits set forth above, it is possible to reduce the battery resistance of a secondary battery that is produced using a slurry for a secondary battery containing the presently disclosed CNT dispersion liquid. On the other hand, when the total solid content concentration in the CNT dispersion liquid is not more than any of the upper limits set forth above, CNTs are allowed to be dispersed well in the CNT dispersion liquid, and thus the viscosity of the CNT dispersion liquid can be stabilized. In addition, it is possible to reduce the battery resistance of a secondary battery that is produced using a slurry for a secondary battery electrode containing the CNT dispersion liquid.

<Proportion of the Binder Relative to the Total Solid Content of the Carbon Nanotube Dispersion Liquid>

Further, the proportion of the binder relative to the total solid content of the CNT dispersion liquid needs to be 30 mass % or less, and is preferably 0.1 mass % or more, more preferably 1 mass % or more, and even more preferably 2 mass % or more, and is preferably 25 mass % or less and more preferably 20 mass % or less. When the proportion of the binder relative to the total solid content of the CNT dispersion liquid is not less than any of the lower limits set forth above, CNTs are allowed to be dispersed well in the CNT dispersion liquid, and thus the viscosity of the CNT dispersion liquid can be stabilized. On the other hand, when the proportion of the binder relative to the total solid content of the CNT dispersion liquid is not more than any of the upper limits set forth above, it is possible to reduce the battery resistance of a secondary battery that is produced using a slurry for a secondary battery electrode containing the presently disclosed CNT dispersion liquid.

<Viscosity Change Rate>

The viscosity change rate of the CNT dispersion liquid as measured under conditions of a temperature of 25° C. and a shear rate of 0.1 $s^{-1}$ before and after leaving the CNT dispersion liquid for 1 week needs to be 50% or more, and is preferably 60% or more and more preferably 70% or more, and needs to be 300% or less, and is preferably 250% or less and more preferably 200% or less. When the viscosity change rate of the CNT dispersion liquid is within any of the ranges set forth above, it is possible to form a favorable conductive path in an electrode mixed material layer that is produced using a slurry for a secondary battery electrode containing the CNT dispersion liquid. This setup makes it possible to reduce the battery resistance of the resultant secondary battery. In this respect, the viscosity of the CNT dispersion liquid before being left to stand is normally 1 mPa·s or more and 200,000 mPa·s or less, and is preferably 100,000 mPa·s or less.

Note that the viscosity change rate of the CNT dispersion liquid can be determined using the methods described in the EXAMPLES section below.

<Preparation of the Carbon Nanotube Dispersion Liquid>

The presently disclosed CNT dispersion liquid can be prepared by dispersing and mixing the components set forth above in a dispersion medium. The mixing method is not particularly limited, and may, for example, be carried out using a known mixer such as a bead mill, a ball mill, a sand mill, a pigment disperser, a grinding machine, an ultrasonic disperser, a homogenizer, a planetary mixer, or a FILMIX. Of these, a bead mill, a homogenizer, or a FILMIX is preferably used.

<Applications of the Carbon Nanotube Dispersion Liquid>

The presently disclosed CNT dispersion liquid is excellent in dispersibility of CNTs in the CNT dispersion liquid. Accordingly, the CNT dispersion liquid can be suitably used for various applications.

Hereinafter, for the purpose of illustration, a slurry for a secondary battery electrode that is produced using the presently disclosed CNT dispersion liquid, and an electrode for a secondary battery and a secondary battery that are produced using the slurry will be described. However, applications of the presently disclosed CNT dispersion liquid are not limited to the following examples.

(Slurry for a Secondary Battery Electrode)

The presently disclosed slurry for a secondary battery electrode contains an electrode active material and the CNT dispersion liquid set forth above. That is, the presently disclosed slurry for a secondary battery electrode contains at least an electrode active material, CNTs, the polymer (A) set forth above, and a dispersion medium. Since the presently disclosed slurry for a secondary battery electrode contains the CNT dispersion liquid set forth above, CNTs are dispersed well in the slurry. Therefore, with the presently disclosed slurry for a secondary battery electrode, CNTs in the CNT dispersion liquid can be used as a conductive material to provide a slurry for a secondary battery electrode in which the conductive material exhibits excellent dispersibility.

<Electrode Active Material>

The electrode active material contained in the presently disclosed slurry for a secondary battery electrode is a material that accepts and donates electrons in an electrode of a secondary battery. For example, in the case of the secondary battery being a lithium ion secondary battery, the electrode active material for a lithium ion secondary battery is normally a material that can occlude and release lithium.

[Positive Electrode Active Material]

Specific examples of the positive electrode active material for a lithium ion secondary battery include, but are not particularly limited to, known positive electrode active materials, such as lithium-containing cobalt oxides (LiCoO$_2$), lithium manganate (LiMn$_2$O$_4$), lithium-containing nickel oxides (LiNiO$_2$), lithium-containing composite oxides of Co—Ni—Mn (Li(CoMnNi)O$_2$), lithium-containing composite oxides of Ni—Mn—Al, lithium-containing composite oxides of Ni—Co—Al, olivine-type iron lithium phosphate (LiFePO$_4$), olivine-type manganese lithium phosphate (LiMnPO$_4$), Li$_2$MnO$_3$—LiNiO$_2$-based solid solution, lithium-rich spinel compound represented by Li$_{1+x}$Mn$_{2-x}$O$_4$ (0<X<2), Li[Ni$_{0.17}$Li$_{0.2}$Co$_{0.07}$Mn$_{0.56}$]O$_2$, and LiNi$_{0.5}$Mn$_{1.5}$O$_4$.

[Negative Electrode Active Material]

In addition, examples of the negative electrode active material for a lithium ion secondary battery include a carbon-based negative electrode active material, a metal-based negative electrode active material, and a negative electrode active material formed by combining these materials.

The carbon-based negative electrode active material can be defined as an active material that contains carbon as its main framework and into which lithium can be inserted (or "doped"). Examples of the carbon-based negative electrode active material include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of the graphitizing carbon include coke, mesocarbon microbeads (MCMB), mesophase pitch-based carbon fiber, and pyrolytic vapor-grown carbon fiber. Examples of the non-graphitizing carbon include sintered phenolic resin, polyacrylonitrile-based carbon fiber, quasi-isotropic carbon, sintered furfuryl alcohol resin (PFA), and hard carbon.

Examples of graphitic materials include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. For the metal-based negative electrode active material, for example, lithium metal, an elementary metal that can be used to form lithium alloys (for example, Ag, Al, Ba, Bi, Cu, Ga, Ge, In, Ni, P, Pb, Sb, Si, Sn, Sr, Zn, Ti, and the like) and alloys thereof; and oxides, sulfides, nitrides, silicides, carbides, and phosphides thereof can be used. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of silicon-based negative electrode active materials include silicon (Si), silicon-containing alloys, SiO, SiO$_x$, and composites of conductive carbon and Si-containing materials obtained by coating or combining the Si-containing materials with conductive carbon.

The amount of the CNT dispersion liquid relative to the electrode active material in terms of solid content is preferably 0.01 parts by mass or more and 3.0 parts by mass or less relative to 100 parts by mass of the electrode active material.

<Other Components>

Other components that may be contained in the slurry for a secondary battery electrode include, but are not particularly limited to, a binder, a conductive additive, a reinforcing agent, a leveling agent, a wetting agent, and a viscosity modifier. One of such components may be used individually, or two or more of such components may be used in combination.

<Preparation of Slurry for a Secondary Battery Electrode>

The presently disclosed slurry for a secondary battery electrode can be prepared by mixing the CNT dispersion liquid with the electrode active material and other optional components. At this time, the mixing method and mixer used are not specifically limited, and may, for example, be those used in the preparation of the CNT dispersion liquid. As to the mixing order, all of the components may be added collectively, or the components may be added in batches and then mixed together. In order to improve the dispersibility of the conductive material, a more preferred method involves first mixing the conductive material with the binder to adjust the CNT dispersion liquid, and then adding the electrode active material and mixing the product.

Hereinafter, for the purpose of illustration, a method of producing a slurry for a secondary battery electrode according to the present disclosure will be described. However, the method of producing a slurry for a secondary battery electrode according to the present disclosure is not limited to the following examples.

[Method of Producing Slurry for a Secondary Battery Electrode]

The method of producing a slurry for a secondary battery electrode according to the present disclosure is a method of producing the slurry for a secondary battery electrode set forth above, comprising: a first step of mixing CNTs, a binder, and a dispersion medium to obtain a carbon nanotube (CNT) dispersion liquid; and a second step of mixing the CNT dispersion liquid and the electrode active material. Note that as the CNTs, binder, and dispersion medium used in the presently disclosed method, those previously described in the CNT dispersion liquid and slurry for a secondary battery electrode set forth above can be used. The preferred ratios of these components are the same as those previously described for the CNT dispersion liquid and slurry for a secondary battery electrode. Note that in the first and second steps, the mixing of the components may be performed by a known method.

(Electrode for a Secondary Battery)

The electrode for a secondary battery according to the present disclosure includes: a current collector; and an electrode mixed material layer formed on the current collector, wherein the electrode mixed material layer is formed using the slurry for a secondary battery electrode set forth above. That is, the electrode mixed material layer includes at least the electrode active material, CNTs, and the polymer (A). Note that the components contained in the electrode mixed material layer are the same as those contained in the slurry for a secondary battery electrode set forth above. The preferred ratios of these components are the same as those previously described for the slurry for a secondary battery electrode.

Since the presently disclosed electrode for a secondary battery is produced using the slurry for a secondary battery electrode containing the CNT dispersion liquid disclosed herein, the conductive material can be dispersed well, and thus an electrode mixed material layer having high uniformity can be favorably formed on the current collector. Therefore, the use of the presently disclosed electrode for a secondary battery may suppress the charge concentration and the occurrence of side reactions caused by aggregation of the conductive material, and thus enables production of a secondary battery with a reduced battery resistance.

<Production of Electrode for a Secondary Battery>

The presently disclosed electrode for a secondary battery is produced, for example, through a step (application step) of applying the slurry for a secondary battery electrode disclosed herein onto a current collector, and a step (drying step) of drying the slurry for a secondary battery electrode applied onto the current collector to form an electrode mixed material layer on the current collector.

[Application Step]

The method by which the slurry for a secondary battery electrode set forth above is applied onto the current collector is not specifically limited, and may be a commonly known method. Specific examples of application methods that can be used include doctor blading, dip coating, reverse roll coating, direct roll coating, gravure coating, extrusion coating, and brush coating. In the application, the slurry for a secondary battery electrode may be applied onto just one side of the current collector, or may be applied onto both sides of the current collector. The thickness of coating of the slurry for a secondary battery electrode on the current collector after the application and before drying may be set as appropriate in accordance with the thickness of the electrode mixed material layer to be obtained after drying.

The current collector onto which the slurry for a secondary battery electrode is applied is a material having electrical conductivity and electrochemical durability. Specifically, the current collector may be made of, for example, iron, copper, aluminum, nickel, stainless steel, titanium, tantalum, gold, or platinum. One of the aforementioned materials may be used individually, or two or more of the aforementioned materials may be used in combination in a freely selected ratio.

[Drying Step]

The slurry for a secondary battery electrode on the current collector may be dried by a commonly known method without any specific limitations. Examples of drying methods include: drying by warm, hot, or low-humidity air; drying in a vacuum; and drying by irradiation with infrared light, electron beams, or the like. Drying of the slurry for a secondary battery electrode on the current collector in this manner forms an electrode mixed material layer on the current collector and thereby provides an electrode for a secondary battery that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

(Secondary Battery)

The presently disclosed secondary battery includes a positive electrode, a negative electrode, an electrolyte solution, and a separator. In the presently disclosed secondary battery, the presently disclosed electrode for a secondary battery is used as at least one of the positive electrode and negative electrode. Since the presently disclosed secondary battery includes the presently disclosed electrode for a secondary battery, it has reduced battery resistance and improved life characteristics.

The presently disclosed secondary battery is preferably a secondary battery in which the presently disclosed electrode for a secondary battery is used as a positive electrode. Although the following describes, as one example, a case in which the secondary battery is a lithium ion secondary battery, the presently disclosed secondary battery is not limited to the following example.

<Electrodes>

Known electrodes that are used in production of secondary batteries can be used without any specific limitations in the presently disclosed secondary battery as an electrode other than the electrode for a secondary battery set forth above. Specifically, an electrode obtained by forming an electrode mixed material layer on a current collector by a known production method may be used as an electrode other than the electrode for a secondary battery set forth above.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these, $LiPF_6$, $LiClO_4$, and $CF_3SO_3Li$ are preferred, and $LiPF_6$ is particularly preferred, as they readily dissolve in solvents and exhibit a high degree of dissociation. One of these supporting electrolytes may be used individually, or two or more of these supporting electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent that is used in the electrolyte solution is not particularly limited as long as the supporting electrolyte dissolves therein. Suitable examples include: carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these organic solvents may also be used. Of these solvents, carbonates are preferred for their high dielectric constant and broad stable potential region, and a mixture of ethylene carbonate and ethyl methyl carbonate is more preferable.

The concentration of the supporting electrolyte in the electrolyte solution may be adjusted as appropriate and is, for example, preferably 0.5 mass % to 15 mass %, more preferably 2 mass % to 13 mass %, and even more preferably 5 mass % to 10 mass %. Known additives such as fluoroethylene carbonate and ethyl methyl sulfone may be added to the electrolyte solution.

<Separator>

Examples of separators that can be used include, but are not particularly limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the proportion of the electrode active material in the secondary battery, and consequently increases the capacity per volume.

<Method of Producing Secondary Battery>

The presently disclosed secondary battery may be produced, for example, by stacking the positive electrode and the negative electrode with the separator in-between, rolling or folding the resultant stack as necessary in accordance with the battery shape to place the stack in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a description of the present disclosure based on examples, yet this disclosure is not limited to these examples. In the following description, "%" and "parts" used in expressing quantities are by mass, unless otherwise specified. In addition, the proportion of each monomer unit in a polymer normally corresponds to the proportion (charging ratio) of monomers that can be used to form the monomer unit in the monomer composition used in polymerization of the polymer.

In the examples and comparative examples, various physical properties were measured or evaluated using the following methods.

<Iodine Value>

The iodine value of each polymer was determined in accordance with HS K6235:2006

<Weight-Average Molecular Weight>

The weight-average molecular weight of each polymer was determined by gel permeation chromatography (GPCs). Specifically, the weight-average molecular weight was calculated as a value in terms of a standard equivalent using polystyrene as a standard substance in a calibration curve. The weight-average molecular weight distribution was evaluated by rounding off (i.e., round up with five or more and round down with four or less) the second digit if the weight-average molecular weight was less than 10,000 and rounding off the third digit if the weight-average molecular weight was 10,000 or greater.

The measurement conditions are as follows.

<<Measurement Conditions>>

The specification of the measurement device used was as follows.

Column: TSK gel α-M columns×2 (φ 7.8 mm I.D.×30 cm×2, Tosoh Corporation)

Elute: dimethylformamide (50 mM lithium bromide, 10 mM phosphoric acid)

Flow rate: 0.5 mL/min

Sample concentration: about 0.5 g/L (solid content concentration)

Injection volume: 200 μL

Column temperature: 40° C.

Detector: differential refractive index detector RI (HLC-8320 GPC RI detector, Tosoh Corporation)

Detector conditions: RI: Pol (+), Res (1.0 s)

Molecular weight marker: standard polystyrene kit (PStQuick K, Tosoh Corporation)

<Viscosity Change Rate>

To determine the viscosity change rates of carbon nanotube dispersion liquids prepared in Examples and Comparative Examples 1 to 7 and the viscosity change rate of an acetylene black dispersion liquid prepared in Comparative Example 8, the following procedure was carried out.

Specifically, a rheometer ("MCR302" manufactured by Anton Paar) was used to measure the viscosity immediately after preparation of each of the carbon nanotube dispersion liquids and the acetylene black dispersion liquid under the conditions of a temperature of 25° C. and a shear rate of 0.1 s$^{-1}$, and each obtained viscosity was taken to be η0. Then, the carbon nanotube dispersion liquids and acetylene black dispersion liquid were sealed and left at 25° C. for 1 week (168 hours). Then, the viscosities of the carbon nanotube dispersion liquids and acetylene black dispersion liquid after being left for one week were measured under the same conditions as prior to being left for one week, and each obtained viscosity was taken to be η1. The viscosity change rate Δη=(η1/η0)×100 was calculated from η0 and η1.

The closer the viscosity change rate is to 100%, the higher the dispersion of carbon nanotubes. Thus, it is possible to form a favorable conductive path inside the positive electrode, making it possible to reduce the battery resistance.

<Electrolyte Solution Resistance>

The electrolyte solution resistance of each binder was evaluated by measuring the swelling ratio of the binder relative to the electrolyte solution Specifically, a binder-containing NMP solution was poured into a Teflon® petri dish (Teflon is a registered trademark in Japan, other countries, or both) so as to have a thickness of 100 μm after drying, and dried by heating at 120° C. for 5 hours or more to prepare a binder film. Each obtained binder film was punched out at 16 mmφ and weighed (this weight is taken as "A"). Each binder film thus obtained was immersed in 20 mL of a non-aqueous electrolyte solution and stored at 60° C. for 72 hours. The non-aqueous electrolyte solution used was a mixture of LiPF$_6$ at a concentration of 1 M as an electrolyte and a product obtained by adding 2 vol % of vinylene carbonate (VC) to ethylene carbonate (EC)/ethylmethyl carbonate (EMC)=3/7 (mass ratio) as a solvent.

Subsequently, each binder film was removed from the non-aqueous electrolyte solution, and the weight of the binder film was measured after sufficiently wiping off the non-aqueous electrolyte solution that was attached to the surface of the binder film (this weight is taken as "B"). Then, from the weights A and B, the swelling ratio [=(B/A)×100 (%)] was determined. As the swelling ratio of the binder relative to the electrolyte solution decreases, the electrolyte solution resistance of the binder improves, and the electrode structure can be maintained. Accordingly, the resistance of the resultant lithium ion secondary battery is reduced, and the life characteristics improve.

A: swelling rate of less than 300%
B: swelling rate of 300% or more and less than 400%
C: swelling rate of 400% or more and less than 500%
D: swelling rate of 500% or more <NMP Solubility>

The solubility of each binder in NMP (hereinafter, also referred to as "NMP solubility") was evaluated by measuring the insoluble component ratio of the binder relative to NMP (hereinafter, referred to as "NMP insoluble component ratio").

Specifically, a binder-containing NMP solution was poured into a Teflon petri dish so as to have a thickness of 100 μm after drying, and dried by heating at 120° C. for 5 hours or more to prepare a binder film. Each obtained binder film was punched out at 16 mmφ and weighed (this weight is taken as "A"). Each binder film thus punched out was immersed in 20 mL of an NMP solution and stored at 60° C. for 72 hours. Then, the NMP solution after storage was filtered through an 80-mesh sieve (the weight of the sieve is taken as "B"), and then the sieve was dried, and the weight of the sieve after drying was measured (this weight is taken as "C"). From the weights A, B, and C, the NMP insoluble component ratio [={(C−B)/A}×100(%)] was determined. A lower NMP insoluble component ratio represents a higher NMP solubility.

A: insoluble component ratio of less than 10%
B: insoluble component ratio of 10% or more and less than 30%
C: insoluble component ratio of 30% or more and less than 50%
D: insoluble component ratio of 50% or more <Peel Strength of Electrode>

A positive electrode having a positive electrode mixed material layer after subjection to roll pressing was cut into a rectangle with a dimension of 1.0 cm in width by 10 cm in length, yielding a test piece. Adhesive cellophane tape was then attached to the surface at the positive electrode mixed material layer side of each test piece. The cellophane tape used was the tape prescribed by JIS Z1522. Each test piece was then peeled off from the cellophane tape, which was secured to a test bed, from one end of the test piece toward its other end at a rate of 300 mm/min while measuring the stress caused by the peeling. This measurement was performed 10 times to obtain an average value of the stress. The average value was taken to be the peel strength (N/m) and was evaluated based on the following criteria.

A greater peel strength means better adherence of the positive electrode mixed material layer to the current collector, and thus higher peel strength of the electrode.

A: peel strength of 10 N/m or more
B: peel strength of 5 N/m or more and less than 10 N/m
C: peel strength of 3 N/m or more and less than 5 N/m
D: peel strength of less than 3 N/m <Flexibility of Electrode>

Each obtained positive electrode was wound around circular cylinders made of SUS (Steel Use Stainless) such that the positive electrode mixed material layer faces outward, and checked for cracks. The flexibility of each electrode was determined as follows in accordance with the largest diameter of the cylinder on which cracks occurred.

The smaller the largest diameter of the cylinder on which cracks occurred, the better the flexibility of the electrode is.

A: 1.5 mm or less
B: more than 1.5 mm and 3 mm or less
C: more than 3 mm and 5 mm or less
D: more than 5 mm <Battery Resistance>

Each obtained lithium ion secondary battery was charged at a constant current of 0.2 C until the battery voltage reached 4.2 V, and was then charged at a constant voltage of 4.2 V until the charging current reached 0.02 C. Subsequently, discharging was performed at a constant current of 0.2 C until the battery voltage reached 3.87 V (SOC 50%), and then the voltage changes after 30 seconds of discharging were measured at 0.2 C, 0.5 C, 1.0 C, 2.0 C, 2.5 C, and 3.0 C, respectively. Then, each discharging current and the amount of voltage changes measured were plotted, and the slope of the resulting line was taken as the resistance value (Ω). Each calculated resistance value was evaluated based on the following criteria.

The lower the resistance value, the lower the battery resistance of the lithium ion secondary battery.

A: resistance value of lower than 4Ω
B: resistance value of 4Ω or more and less than 5Ω
C: resistance value of 5Ω or more and less than 6Ω
D: resistance value of 6Ω or more <Life Characteristics>

For each obtained lithium ion secondary battery, 100 cycles were performed of a repeated operation in which, at a temperature of 45° C., charging was performed at a constant current of 1 C until the battery voltage reached 4.2 V, and discharging was performed at a constant current of 1 C until the battery voltage reached 3 V. Then, the discharge capacity of the 100th cycle (this discharge capacity is taken as "B") was calculated as a percentage relative to the discharge capacity of the 1st cycle (this discharge capacity is taken as "A") to determine a charge/discharge capacity retention rate [=(B)/(A)×100(%)], and the charge/discharge capacity retention rate was evaluated according to the following criteria.

A higher charge/discharge capacity retention rate indicates better life characteristics.
A: charge/discharge capacity retention rate of 90% or more
B: charge/discharge capacity retention rate of 85% or more and less than 90
C: charge/discharge capacity retention rate of 80% or more and less than 85
D: charge/discharge capacity retention rate of less than 80%

Example 1

<Preparation of Polymer (A)>
A reactor was charged with, in the stated order, 180 parts of deionized water, parts of an aqueous sodium dodecylbenzenesulfonate solution (concentration 10%) as a emulsifier, 42 parts of styrene as an aromatic vinyl monomer, 14 parts of acrylonitrile as a nitrile group-containing monomer, 5 parts of methacrylic acid as a monomer having a carboxy group, and 2 parts of t-dodecyl mercaptan as a molecular weight modifier. Then, gas inside of the reactor was purged three times with nitrogen and 39 parts of 1,3-butadiene was subsequently added as a conjugated diene monomer. The reactor was maintained at 10° C. and charged with 0.1 parts of cumene hydroperoxide as a polymerization initiator to initiate a polymerization reaction, and the polymerization reaction was allowed to proceed while stirring. Once the conversion rate of the monomer to the polymer reached 85%, 2,2,6,6-tetramethylpiperidine 1-oxyl (TEMPO) was caused to act as a terminator, and then a rotary evaporator having a water temperature of 60° C. was used to remove residual monomers and thereby obtain a water dispersion of a precursor (particulate polymer) of the target polymer. Each obtained water dispersion (total solid content 48 g) of the precursor of the polymer was charged to a 1 L autoclave equipped with a stirrer, and nitrogen gas was passed through the water dispersion for 10 minutes to remove dissolved oxygen present therein. Thereafter, as a hydrogenation reaction catalyst, 50 mg of palladium acetate was dissolved in 180 mL of water to which nitric acid had been added in an amount of four molar equivalents of palladium (Pd), and the resultant solution was added to the autoclave. After purging the system twice with hydrogen gas, the contents of the autoclave were heated to 50° C. in a state in which the hydrogen gas pressure was raised to 3 MPa, and a hydrogenation reaction was carried out for 6 hours to obtain the target polymer (A). The monomer composition, iodine value, and weight-average molecular weight of each obtained polymer (A) are listed in Table 1.

<Preparation of NMP Solution Containing Polymer (A)>
Each water dispersion of the polymer (A) thus obtained was mixed with NMP as a dispersion medium to obtain a mixed solution. The water contained in each obtained mixed solution was then all evaporated under reduced pressure to obtain an NMP solution containing the polymer (A). Each obtained NMP solution containing the polymer (A) was used as a binder. The electrolyte solution resistance and NMP solubility of each binder (polymer (A)) were evaluated. The results are listed in Table 1.

<Preparation of Carbon Nanotube Dispersion Liquid>
Here, 6.8 parts of carbon nanotubes (with a specific surface area of 150 $m^2/g$), 1.2 parts (in terms of solid content) of the above-described NMP solution containing the polymer (A), and 92.0 parts of NMP were stirred using a disper blade (at 3000 rpm for 10 minutes), and then mixed at a peripheral speed of 8 m/s for 1 hour using a bead mill with zirconia beads of 1 mm in diameter to prepare a carbon nanotube dispersion liquid having a solid content concentration of 8.0 mass %. For this carbon nanotube dispersion liquid, the viscosity was measured using a rheometer ("MCR302" produced by Anton Paar) under conditions of a temperature of 25° C. and a shear rate of 0.1 $s^{-1}$, and it was determined to be 500 mPa·s.

The viscosity change rate of each obtained carbon nanotube dispersion liquid was measured. The results are listed in Table 1.

<Preparation of Slurry for a Positive Electrode>
As a positive electrode active material, 97.0 parts of a ternary active material having a layered structure ($LiNi_{0.5}Co_{0.2}Mn_{0.3}O_2$), with an average particle diameter of 10 μm), 1.0 parts in terms of solid content of a carbon nanotube dispersion liquid obtained as described above, 2.0 parts of polyvinylidene fluoride (PVdF, #7208 produced by KUREHA Corporation), and NMP as a dispersion medium were added and stirred using a planetary mixer (at 60 rpm for 30 minutes) to prepare a slurry for a positive electrode. Note that the amount of NMP added was adjusted such that the viscosity of the resultant slurry for a positive electrode (as measured by a single cylindrical rotational viscometer in accordance with HS Z8803:1991, at a temperature of 25° C. and a rotational speed of 60 rpm) fallen within the range of 4000 mPa·s to 5000 mPa·s.

<Production of Positive Electrode>
Aluminum foil of 20 μm in thickness was prepared as a current collector. The slurry for a positive electrode obtained as set forth above was applied onto one side of the aluminum foil using a comma coater so as to have a coating weight after drying of 20 $mg/cm^2$. The applied slurry for a positive electrode was dried for 20 minutes at 90° C. and for 20 minutes at 120° C., and was then heat-treated for 10 hours at 60° C. to obtain a positive electrode web. The positive electrode web was rolled by roll pressing to produce a positive electrode in the form of a sheet composed of a positive electrode mixed material layer with a density of 3.2 $g/cm^3$ (per side) and aluminum foil. The thickness of the sheet-shaped positive electrode was 70 μm. The sheet-shaped positive electrode was cut to 4.6 cm in width and 50 cm in length for use as a positive electrode for a lithium ion secondary battery. Each obtained positive electrode was evaluated for its peel strength and flexibility. The results are listed in Table 1.

<Production of Negative Electrode>
A mixture of 90 parts of spherical artificial graphite (with a volume-average particle diameter of 12 μm) as a negative electrode active material and 10 parts of $SiO_x$ (with a volume-average particle diameter of 10 μm), 1 part of a styrene-butadiene polymer as a binding agent, 1 part of carboxymethyl cellulose as a thickener, and an appropriate amount of water as a dispersion medium were stirred using a planetary mixer to prepare a slurry for a negative electrode.

Then, copper foil with a thickness of 15 μm was prepared as a current collector. The slurry for a negative electrode obtained as set forth above was applied onto one side of the copper foil so as to have a coating weight after drying of 10 mg/cm², and was dried for 20 minutes at 60° C. and for 20 minutes at 120° C. Subsequently, the resultant slurry composition was heat-treated for 2 hours at 150° C. to obtain a negative electrode web. This negative electrode web was rolled by roll pressing to produce a negative electrode in the form of a sheet composed of a negative electrode mixed material layer with a density of 1.8 g/cm³ (per side) and copper foil. Then, the sheet-shaped negative electrode was cut to 4.8 cm in width and 52 cm in length for use as a negative electrode for a lithium ion secondary battery.

<Production of Lithium Ion Secondary Battery>

Each positive electrode and negative electrode that were obtained as set forth above were wound around a 20 mm diameter core with a separator (a fine porous membrane made of polypropylene with a thickness of 15 μm) interposed therebetween to obtain a wound body. The resultant wound body was compressed in one direction at a rate of 10 mm/sec to a thickness of 4.5 mm. Note that the compressed wound body had an elliptical shape in plan view, and the ratio of the major axis to the minor axis (major axis/minor axis) was 7.7.

Further, an electrolyte solution (composition: a $LiPF_6$ solution having a concentration of 1.0 M, in which the solvent was a mixed solution obtained by adding 5 mass % of fluoroethylene carbonate to a mixed solvent of ethylene carbonate/ethyl methyl carbonate in a 3/7 mass ratio, and 2 vol % of vinylene carbonate was added as an additive) was prepared.

After that, the compressed wound body was housed in an aluminum laminate case along with 3.2 g of a non-aqueous electrolyte solution. Then, after connecting a nickel lead wire to the negative electrode at a specific position and an aluminum lead wire to the positive electrode at a specific position, the opening of the laminate case was thermally sealed to obtain a lithium ion secondary battery. This lithium ion secondary battery had a pouch-shape of about 35 mm wide, about 50 mm high, and about 5 mm thick, and the nominal capacity of the battery was 750 mAh. Each obtained lithium ion secondary battery was evaluated for battery resistance and life characteristics (at a charge voltage of 4.45 V). The results are listed in Table 1.

Examples 2 to 6

A polymer (A) was prepared such that the proportion of repeating units in the polymer (A) as listed in Table 1 was obtained. Further, in Example 2, a polymer (A) was prepared such that the iodine value as listed in Table 1 was obtained by changing the amount of palladium acetate as an hydrogenation reaction catalyst used in the hydrogenation reaction to 40 mg. Otherwise, the polymer (A), an NMP solution containing the polymer (A), a carbon nanotube dispersion, a slurry for a positive electrode, a positive electrode, a negative electrode, and a lithium ion secondary battery were prepared in the same manner as in Example 1. Evaluations were conducted in the same manner as in Example 1. The results are listed in Table 1.

Examples 7 to 9

The amount of t-dodecyl mercaptan was changed such that the weight-average molecular weight of the polymer (A) as listed in Table 1 was obtained. Specifically, the amount of t-dodecyl mercaptan used was 4 parts in Example 7, 1.2 parts in Example 8, and 0.8 parts in Example 9. Otherwise, the polymer (A), an NMP solution containing the polymer (A), a carbon nanotube dispersion liquid, a slurry for a positive electrode, a positive electrode, a negative electrode, and a lithium ion secondary battery were prepared in the same manner as in Example 1. Evaluations were conducted in the same manner as in Example 1. The results are listed in Table 1.

Example 10

A polymer (A), an NMP solution containing the polymer (A), a carbon nanotube dispersion liquid, a slurry for a positive electrode, a positive electrode, a negative electrode, and a lithium ion secondary battery were prepared in the same manner as in Example 1, except that the proportion of the binder relative to the total solid content of the carbon nanotube dispersion liquid was changed as listed in Table 1. Evaluations were conducted in the same manner as in Example 1. The results are listed in Table 1.

Example 11

A polymer (A), a carbon nanotube dispersion liquid, a slurry for a positive electrode, a positive electrode, a negative electrode, and a lithium ion secondary battery were prepared in the same manner as in Example 1, except that PVDF was added to an NMP solution containing the polymer (A) for use as a binder such that the proportion of PVDF relative to the total solid content of the binder in the CNT dispersion liquid was 20 mass %. Evaluations were conducted in the same manner as in Example 1. The results are listed in Table 1.

Comparative Examples 1 to 5

A polymer (A) was prepared such that the proportion of repeating units in the polymer (A) as listed in Table 2 was obtained. In addition, in Comparative Example 1, a polymer (A) was prepared such that the iodine value as listed in Table 1 was obtained by changing the amount of palladium acetate as an hydrogenation reaction catalyst used in the hydrogenation reaction to 20 mg. Otherwise, the polymer (A), an NMP solution containing the polymer (A), a carbon nanotube dispersion, a slurry for a positive electrode, a positive electrode, a negative electrode, and a lithium ion secondary battery were prepared in the same manner as in Example 1. Evaluations were conducted in the same manner as in Example 1. The results are listed in Table 2.

Comparative Example 6

A polymer (A) was prepared such that the proportion of repeating units in the polymer (A) as listed in Table 2 was obtained. In addition, the amount of t-dodecyl mercaptan was changed to 0.6 parts such that the weight-average molecular weight of the polymer (A) as listed in Table 1 was obtained. Otherwise, the polymer (A), an NMP solution containing the polymer (A), a carbon nanotube dispersion, a slurry for a positive electrode, a positive electrode, a negative electrode, and a lithium ion secondary battery were prepared in the same manner as in Example 1. Evaluations were conducted in the same manner as in Example 1. The results are listed in Table 2.

Comparative Example 7

A polymer (A) was prepared such that the proportion of repeating units in the polymer (A) as listed in Table 2 was obtained. In addition, the proportion of the binder relative to the total solid content of the carbon nanotube dispersion liquid was changed as listed in Table 1. Otherwise, the polymer (A), an NMP solution containing the polymer (A), a carbon nanotube dispersion, a slurry for a positive electrode, a positive electrode, a negative electrode, and a lithium ion secondary battery were prepared in the same manner as in Example 1. Evaluations were conducted in the same manner as in Example 1. The results are listed in Table 2.

Comparative Example 8

In the preparation of a carbon nanotube dispersion liquid, instead of carbon nanotubes, acetylene black was used to prepare an acetylene black dispersion liquid. Then, for this acetylene black dispersion liquid, the viscosity change rate was measured. The results are listed in Table 2.

Then, a polymer (A), an NMP solution containing the polymer (A), a slurry for a positive electrode, a positive electrode, a negative electrode, and a lithium ion secondary battery were prepared in the same manner as in Example 1, except that the acetylene black dispersion liquid set forth above was used instead of a carbon nanotube dispersion liquid. Evaluations were conducted in the same manner as in Example 1. The results are listed in Table 2.

In Tables 1 and 2 below, the following abbreviations are used:
"CNT" indicates carbon nanotubes;
"Ace.B" indicates acetylene black;
"ST" indicates styrene;
"(H-)BD" indicates a hydrogenated 1,3-butadiene unit;
"AN" indicates an acrylonitrile unit; and
"MAA" indicates (meth)acrylic acid.

TABLE 1

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Conductive material | | CNT | CNT | CNT | CNT | CNT | CNT | CNT | CNT | CNT | CNT | CNT |
| CNT specific surface area (m$^2$/g) | | 150 | 150 | 150 | 150 | 150 | 150 | 150 | 150 | 150 | 150 | 150 |
| Polymer (A) | Aromatic vinyl monomer unit (mass %) | ST 42 | ST 41 | ST 33 | ST 58 | ST 48 | ST 40 | ST 42 | ST 42 | ST 42 | ST 42 | ST 42 |
| | Linear alkylene structural unit having a carbon number of at least 4 (mass %) | (H-)BD 35 | (H-)BD 33.5 | (H-)BD 40 | (H-)BD 22 | (H-)BD 22 | (H-)BD 43 | (H-)BD 35 | (H-)BD 35 | (H-)BD 35 | (H-)BD 35 | (H-)BD 35 |
| | Conjugated diene monomer unit (mass %) | 4 | 6.5 | 4 | 4 | 4 | 4 | 4 | 4 | 4 | 4 | 4 |
| | Iodine value (mg/100 mg) | 15 | 38 | 15 | 15 | 15 | 15 | 15 | 15 | 15 | 15 | 15 |
| | Nitrile group-containing monomer unit (mass %) | AN 14 | AN 14 | AN 18 | AN 11 | AN 21 | AN 10 | AN 14 | AN 14 | AN 14 | AN 14 | AN 14 |
| | Hydrophilic group-containing monomer unit (mass %) | MAA 5 | MAA 5 | MAA 5 | MAA 5 | MAA 5 | MAA 3 | MAA 5 | MAA 5 | MAA 5 | MAA 5 | MAA 5 |
| | Weight-average molecular weight (Mw) | 50,000 | 50,000 | 50,000 | 50,000 | 50,000 | 50,000 | 1,000 | 150,000 | 400,000 | 50,000 | 50,000 |
| Total solid content concentration (mass %) | | 8 | 8 | 8 | 8 | 8 | 8 | 8 | 8 | 8 | 8 | 8 |
| Proportion of the binder relative to the total solid content (mass %) | | 15 | 15 | 15 | 15 | 15 | 15 | 15 | 15 | 15 | 25 | 15 |
| Viscosity change rate (%) | | 110 | 250 | 270 | 90 | 150 | 260 | 70 | 170 | 290 | 90 | 240 |
| PVDF relative to the total solid content of the binder in the CNT dispersion liquid (mass %) | | — | — | — | — | — | — | — | — | — | — | 20 |
| Evaluation | Electrolyte solution resistance | A | B | A | A | A | A | B | A | A | A | A |
| | NMP solubility | A | A | C | A | A | C | A | B | C | A | A |
| | Peel strength of electrode | A | A | A | B | A | B | B | A | A | A | A |
| | Flexibility of electrode | A | A | A | C | C | A | A | A | A | A | A |
| | Battery resistance | A | B | C | C | B | C | A | B | C | B | B |
| | Life characteristics | A | C | C | C | C | C | C | B | C | B | B |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Conductive material | | CNT | CNT | CNT | CNT | CNT | CNT | CNT | Ace.B. |
| CNT specific surface area (m$^2$/g) | | 150 | 150 | 150 | 150 | 150 | 150 | 150 | 0 |
| Polymer (A) | Aromatic vinyl monomer unit (mass %) | ST 45 | ST 28 | ST 40 | ST 45 | — | ST 45 | ST 45 | ST 45 |
| | Linear alkylene structural unit having a carbon number of at least 4 (mass %) | (H-)BD 24.5 | (H-)BD 40 | (H-)BD 53 | — | (H-)BD 35 | (H-)BD 30 | (H-)BD 30 | (H-)BD 30 |
| | Conjugated diene monomer unit (mass %) | 9.5 | 4 | 4 | — | 4 | 4 | 4 | 4 |

TABLE 2-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | Iodine value (mg/100 mg) | 55 | 15 | 15 | — | 15 | 15 | 15 | 15 |
|  | Nitrile group-containing monomer unit (mass %) | AN 16 | AN 23 | AN 0 | AN 50 | AN 56 | AN 16 | AN 16 | AN 16 |
|  | Hydrophilic group-containing monomer unit (mass %) | MAA 5 | MAA 5 | MAA 3 | MAA 5 | MAA 5 | MAA 5 | MAA 5 | MAA 5 |
|  | Weight-average molecular weight (Mw) | 50,000 | 50,000 | 50,000 | 50,000 | 50,000 | 520,000 | 50,000 | 50,000 |
| Total solid content concentration (mass %) |  | 8 | 8 | 8 | 8 | 8 | 8 | 8 | 8 |
| Proportion of the binder relative to the total solid content (mass %) |  | 15 | 15 | 15 | 15 | 15 | 15 | 35 | 15 |
| Viscosity change rate (%) |  | 450 | 400 | 640 | 280 | 300 | 500 | 70 | 80 |
| PVDF relative to the total solid content of the binder in the CNT dispersion liquid (mass %) |  | — | — | — | — | — | — | — | — |
| Evaluation | Electrolyte solution resistance | C | A | A | D | D | A | A | A |
|  | NMP solubility | A | D | D | A | D | D | A | A |
|  | Peel strength of electrode | A | A | B | A | A | A | A | A |
|  | Flexibility of electrode | A | A | A | D | A | A | A | A |
|  | Battery resistance | D | D | D | D | D | D | D | D |
|  | Life characteristics | D | D | D | D | D | D | D | D |

The following can be seen from the examples and comparative examples.

In those cases where the viscosity change rate of the carbon nanotube dispersion liquid is outside the presently disclosed range (Comparative Examples 1 to 3 and 6), where the polymer (A) contained in the carbon nanotube dispersion liquid does not contain a linear alkylene structural unit having a carbon number of at least 4 (Comparative Example 4), where the polymer (A) does not contain an aromatic vinyl monomer (Comparative Example 5), where the proportion of the binder relative to the total solid content of the carbon nanotube dispersion liquid is outside the presently disclosed range (Comparative Example 7), and where the dispersion liquid contains acetylene black instead of carbon nanotubes (Comparative Example 8), it can be seen that the resultant lithium ion secondary batteries had increased battery resistance and inferior life characteristics.

In contrast, from the Examples of the present disclosure, it can be seen that the battery resistance and the life characteristics of the lithium ion secondary batteries can be further improved by adjusting the types and proportions of repeating units in the polymer (A), the iodine value, and the weight-average molecular weight of the polymer (A).

INDUSTRIAL APPLICABILITY

According to the present disclosure, it is possible to provide a carbon nanotube dispersion liquid that is useful for various applications because of excellent dispersibility of CNTs.

In addition, according to the present disclosure, it is possible to provide a slurry for a secondary battery electrode that can be suitably used in the production of a secondary battery.

Moreover, according to the present disclosure, it is possible to provide an electrode for a secondary battery capable of improving battery characteristics of a secondary battery, and a secondary battery having excellent battery characteristics such as battery resistance and life characteristics.

The invention claimed is:

1. A carbon nanotube dispersion liquid containing carbon nanotubes, a binder, and a dispersion medium, wherein
    the binder is free of a water-soluble polymer and includes a polymer (A) containing an aromatic vinyl monomer unit and a linear alkylene structural unit having a carbon number of at least 4,
    a proportion of the binder relative to a total solid content of the carbon nanotube dispersion liquid is 30 mass % or less,
    a viscosity change rate of the carbon nanotube dispersion liquid as measured under conditions of a temperature of 25° C. and a shear rate of 0.1 s$^{-1}$ before and after leaving the carbon nanotube dispersion liquid for 1 week is 50% or more and 240% or less,
    the polymer (A) contains the aromatic vinyl monomer unit in an amount of 35 mass % or more and 60 mass % or less and the linear alkylene structural unit having a carbon number of at least 4 in an amount of 25 mass % or more and 35 mass % or less,
    the polymer (A) has an iodine value of 50 mg/100 mg or less,
    the polymer (A) has a weight-average molecular weight of 5,000 or more and 300,000 or less,
    a specific surface area of the carbon nanotubes is 50 m$^2$/g or more and 400 m$^2$/g or less, and
    the dispersion medium includes at least N-methyl-2-methylpyrrolidone.

2. A slurry for a secondary battery electrode comprising an electrode active material and the carbon nanotube dispersion liquid as recited in claim 1.

3. A method of producing the slurry for a secondary battery electrode as recited in claim 2, comprising:
    a first step of mixing the carbon nanotubes, the binder, and the dispersion medium to obtain a carbon nanotube dispersion liquid; and
    a second step of mixing the carbon nanotube dispersion liquid and the electrode active material.

4. An electrode for a secondary battery comprising an electrode mixed material layer formed using the slurry for a secondary battery electrode as recited in claim 2.

5. A secondary battery comprising the electrode for a secondary battery as recited in claim 4.

6. The carbon nanotube dispersion liquid according to claim 1, wherein the binder consists of the polymer (A) and optionally a polymer (B) selected from a group consisting of a fluorine-containing polymer, polyacrylonitrile, and a combination thereof.

* * * * *